United States Patent
Lee

(10) Patent No.: US 7,352,414 B2
(45) Date of Patent: Apr. 1, 2008

(54) FAVORITE CHANNEL REMOTE CONTROLLER AND METHOD

(75) Inventor: Sung Sub Lee, Anyang (KR)

(73) Assignee: Seoby Electronics Co., Ltd., Kyungki-Du (KR)

( * ) Notice: Subject to any disclaimer, the term of this patent is extended or adjusted under 35 U.S.C. 154(b) by 872 days.

(21) Appl. No.: 10/630,956

(22) Filed: Jul. 30, 2003

(65) Prior Publication Data

US 2004/0021640 A1    Feb. 5, 2004

(30) Foreign Application Priority Data

Jul. 30, 2002    (KR)    ............... 2002-0044919

(51) Int. Cl.
*H04N 5/44*    (2006.01)
(52) U.S. Cl. ............................................. 348/734
(58) Field of Classification Search ............... 348/734, 348/725; 340/825.72; 341/176, 173, 180; *H04N 5/44*
See application file for complete search history.

(56) References Cited

U.S. PATENT DOCUMENTS

| 4,703,359 | A | 10/1987 | Rumboldt et al. |
| 5,414,426 | A | 5/1995 | O'Donnell et al. |
| 5,872,562 | A | 2/1999 | McConnell et al. |
| 5,963,269 | A | 10/1999 | Beery |
| 6,750,802 | B1 * | 6/2004 | Olen ..................... 341/176 |

* cited by examiner

*Primary Examiner*—Sherrie Hsia
(74) *Attorney, Agent, or Firm*—Kramer Levin Naftalis and Frankel LLP; Gregor N. Neff

(57) ABSTRACT

The remote controller has separate groups of channels, each accessible by means of a Favorite Channel Key. Channels preferably are grouped in accordance with a common characteristic, such as sports channels, movie channels, etc. One of several channels within each group can be selected by operation of the usual up/down channel controls on the remote control unit. When a Favorite Channel Key has not been actuated, the up/down controls are operative to scroll through all of the channels available to the television receiver.

10 Claims, 4 Drawing Sheets

FAVORITE CHANNEL REMOTE CONTROLLER AND METHOD

Priority for this patent application is claimed from Republic of Korea patent application Serial No. 20002-0044919, filed Jul. 30, 2002.

This invention relates to remote control devices and methods for controlling television receivers, VCRs, DVD players and recorders, etc.

A problem which has existed for some time but has recently become more significant is the difficulty of selecting desired channels from the long list of channels now available on many TV receivers connected to cable or satellite systems.

One proposal in the past has been to allow the television viewer to select one or more small groups of channels which are the favorites of the viewer, and then to select from among the much smaller group or groups, thus facilitating the location of the viewer's favorite channels.

Various problems have been discovered with the proposed prior systems and methods. Among these problems are extra cost and complexity of the remote control unit used for the selection because of the need for extra controls, extra complexity for the viewer in operating the remote, and/or a lack of simplicity in programming required by the user.

It is an object of the present invention to ameliorate the foregoing problems, and to provide a remote control unit and method which are relatively simple to operate, relatively simple in construction, and relatively inexpensive to manufacture.

In accordance with the present invention, the foregoing objects are met by providing a remote control device and method in which a plurality of groups of channels are formed, each group being selectable by the operation of a single key stroke. A plurality of different channel numbers are stored in each group. Then, the ordinary up/down channel selection controls on the remote control unit can be used to select a preferred channel from within each group.

The composition of each of the various groups can be created in accordance with the viewer's wishes. For example, one group of channels can relate to sports, another group can relate to movies, a third group can relate to news programs, etc.

The remote control unit and the method of using it are relatively simple to use and inexpensive to manufacture, and therefore meet the objectives set forth above.

The foregoing and other objects and advantages of the invention will be set forth in or apparent from the following specification and drawings.

IN THE DRAWINGS

GENERAL DESCRIPTION

Figure 1:
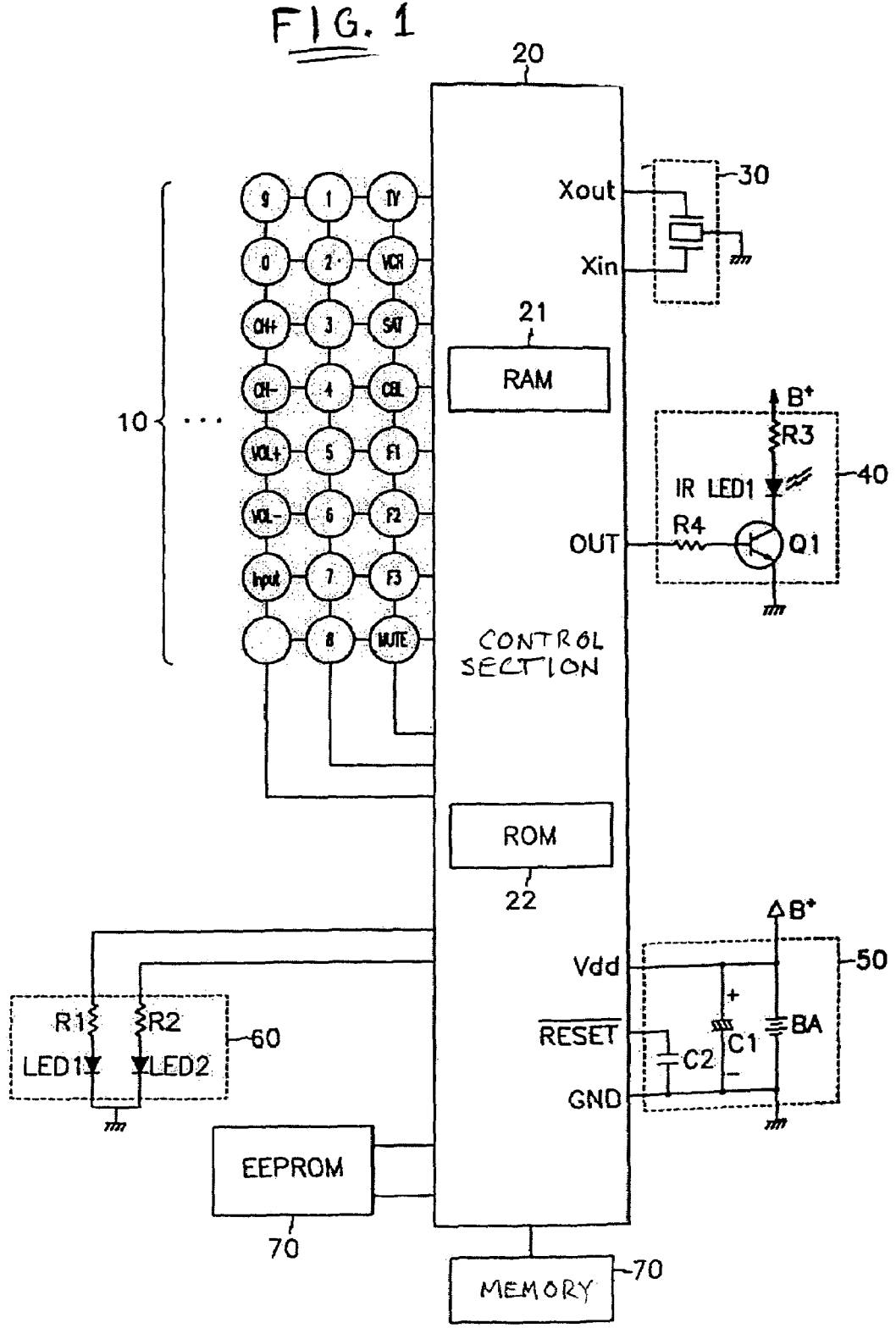
FIG. 1 is a schematic diagram of a remote control unit constructed in accordance with the present invention.

The remote controller unit shown in FIG. 1 includes a key input section 10, a control section 20, a crystal oscillator clock source 30, an infra-red signal transmitter 40, a power supply section 50, a display section 60 including two status indicator LED's and an auxiliary memory section 70.

The key input section 10 is implemented by a multiple-point matrix circuit so that when a key is depressed, a voltage signal is transmitted to the control section 20.

The key input section 10 includes device selection keys (TV, VCR, SAT (SATELLITE), CBL (CABLE)) for selecting which device is to be controlled by the controller unit. The keys also include an On-Off key (INPUT), channel up/down keys (CH+, CH−), volume up/down keys (VOL +, VOL −), a mute key (MUTE), and numerical keys 0-9.

In accordance with the present invention, the key input section includes three favorite channel keys (F1, F2, and F3). The codes for up to five different TV channels are controlled by each of the favorite channel keys.

The control section 20 includes a microprocessor (not shown) which has RAM memory 21 and ROM memory 22.

The remote control unit preferably is a "universal" unit programmable for remotely controlling several different types of devices, such as television receivers, VCR's, satellite receivers, etc., including devices made by different manufacturers. Typically, a list of access code formats for different products manufactured by different manufacturers are listed in an instruction booklet. The user programs his remote unit using those code formats. The code formats are stored in ROM 22 by the maker.

The algorithms for the control program also are stored in the RAM 21. The control signals for the groups of signals controlled by the FAV keys also are stored in the RAM 21.

When the operation of a FAV key and the channel up/down key or keys are operated to select a channel from the group, a control signal for the selected channel is transmitted from the transmitter section 40 to select a channel on the television receiver being controlled.

The crystal controlled oscillator 30 produces a signal at a frequency suitable for use by the transmitter 40.

The transmitter 40 transmits an infrared ("IR") control signal determined by the control section 20.

The transistor 40 receives a signal on its base electrode through a resistor $R_4$ from the control section 20. When the transistor $Q_1$ turns on, it enables a signal to flow through the IR LED to transmit a corresponding signal.

The power supply 50 includes a battery BA, which may be an ordinary long-life dry cell, or a rechargeable battery. The battery BA provides power for the operation of the remote control unit, and supplies battery backup power to prevent the loss of data stored in the RAMs 21 and 70.

The display 60 includes a pair of LED's which emit visible light to inform the user of the operation of the remote control unit, in the manner to be described below.

The memory 70 is external to the microprocessor. It is used as supplemental memory to the RAM 21, and stores updated data.

Figure 2:
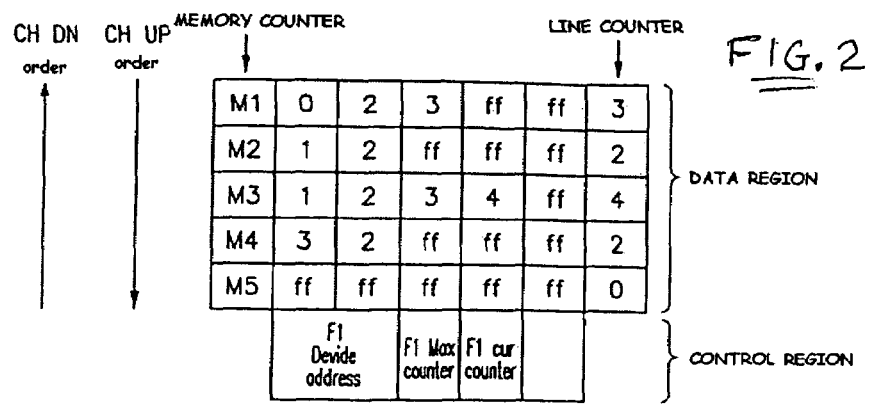
FIG. 2 is a schematic drawing indicating the layout and operation of a memory of the unit shown in FIG. 1.

FIG. 2 is a schematic diagram of a data register formed in the RAM 21 for storing the favorite channel selection data, and will be described in greater detail below.

Control Operation

Figure 3:
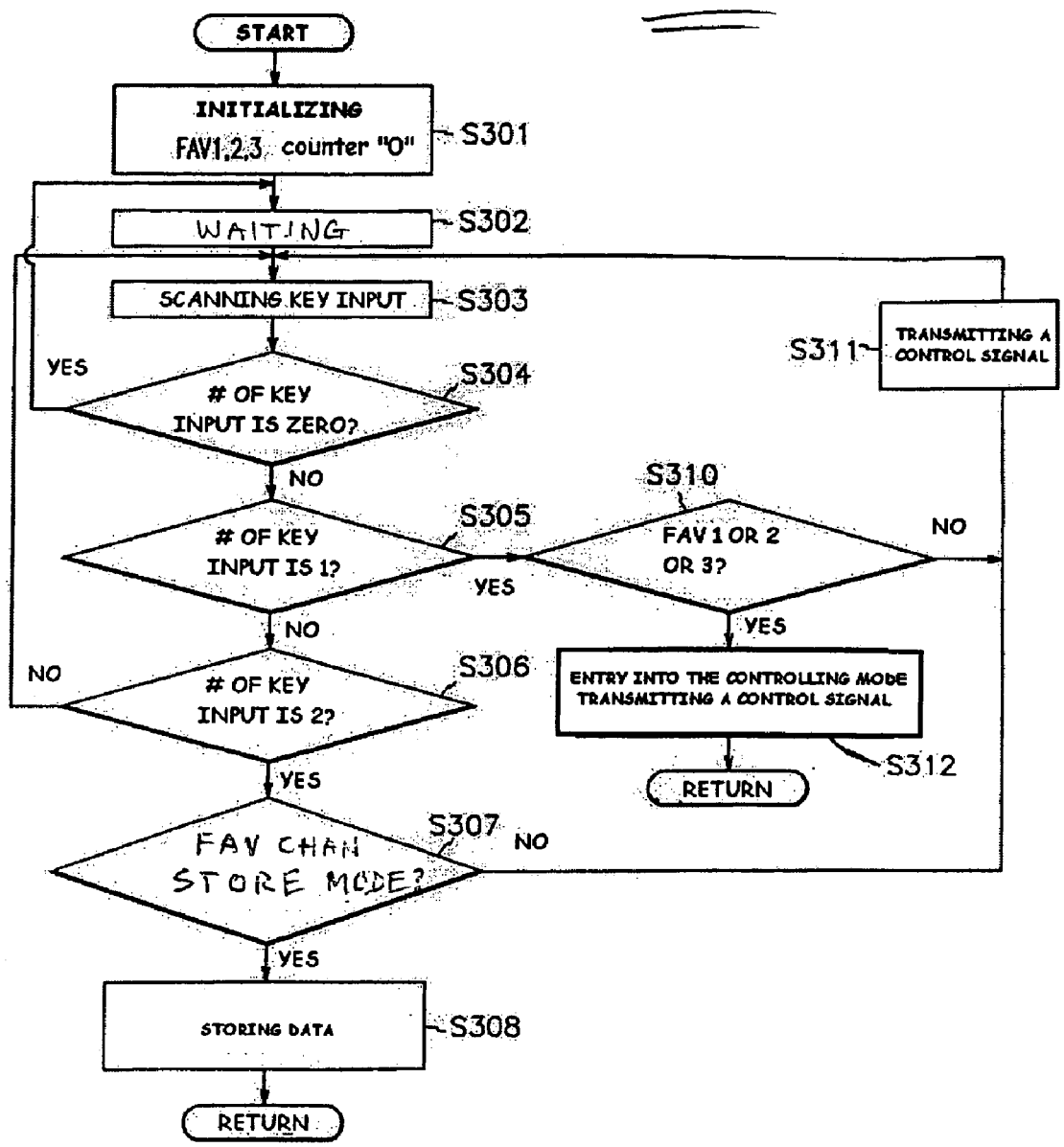

FIG. 3 is a flow chart showing the program used to establish the various groups to show the operation of the remote unit.

At the start, S301, the microprocessor waits, as indicated at S302 and looks for a key input, as indicated at S303.

When a key has been operated, at step S304, it is determined whether the number of keys operated is zero. If so, the system returns to the waiting mode S302 to repeat the input scanning procedure.

If the number of keys actuated is not zero, it is determined at S305 whether the number of keys actuated is one. If not, it is determined at S306 whether the number of keys actuated is two. If so, it is determined at S307, by a process shown in greater detail in FIG. 4, whether the Favorite Channel Store mode is to be entered. If so, data defining the channels is stored in the register shown in FIG. 2 in RAM 21 or external memory 70.

Entering the favorite channel store mode requires a simultaneous actuation of one of the favorite channel keys and the MUTE key. Of course, if desired, any key other than the MUTE key or one of the Favorite Channels keys can be selected as the second key to be pressed simultaneously with the favorite channel key in order to initiate the store mode.

If the Favorite Channel Store mode is not indicated, normal operation is started. The microprocessor extracts a control frequency corresponding to the selected key from the ROM 22 and transmits a corresponding control signal by means of the transmitter 40, as indicated at S311, to select a channel in the receiver.

If the number of keys actuated is equal to one, as determined at S305, then, at S310, it is determined whether it is one of the three favorite channel keys $F_1$, $F_2$, $F_3$ that has been actuated. If not, then the key actuation is recognized as an ordinary channel selection signal and a control signal is transmitted as indicated at S311.

If it is determined that one of the three favorite channels keys has been actuated, then the microprocessor enters into a control mode as indicated at S312 in which the favorite key feature of the invention is used. In this process, and when the channel up/down keys have been operated to select a channel within the group controlled by the favorite key, a control signal is read out of RAM 21 or memory 70 and is transmitted through the transmitter 40.

Favorite Channel Store Mode

Figure 4:
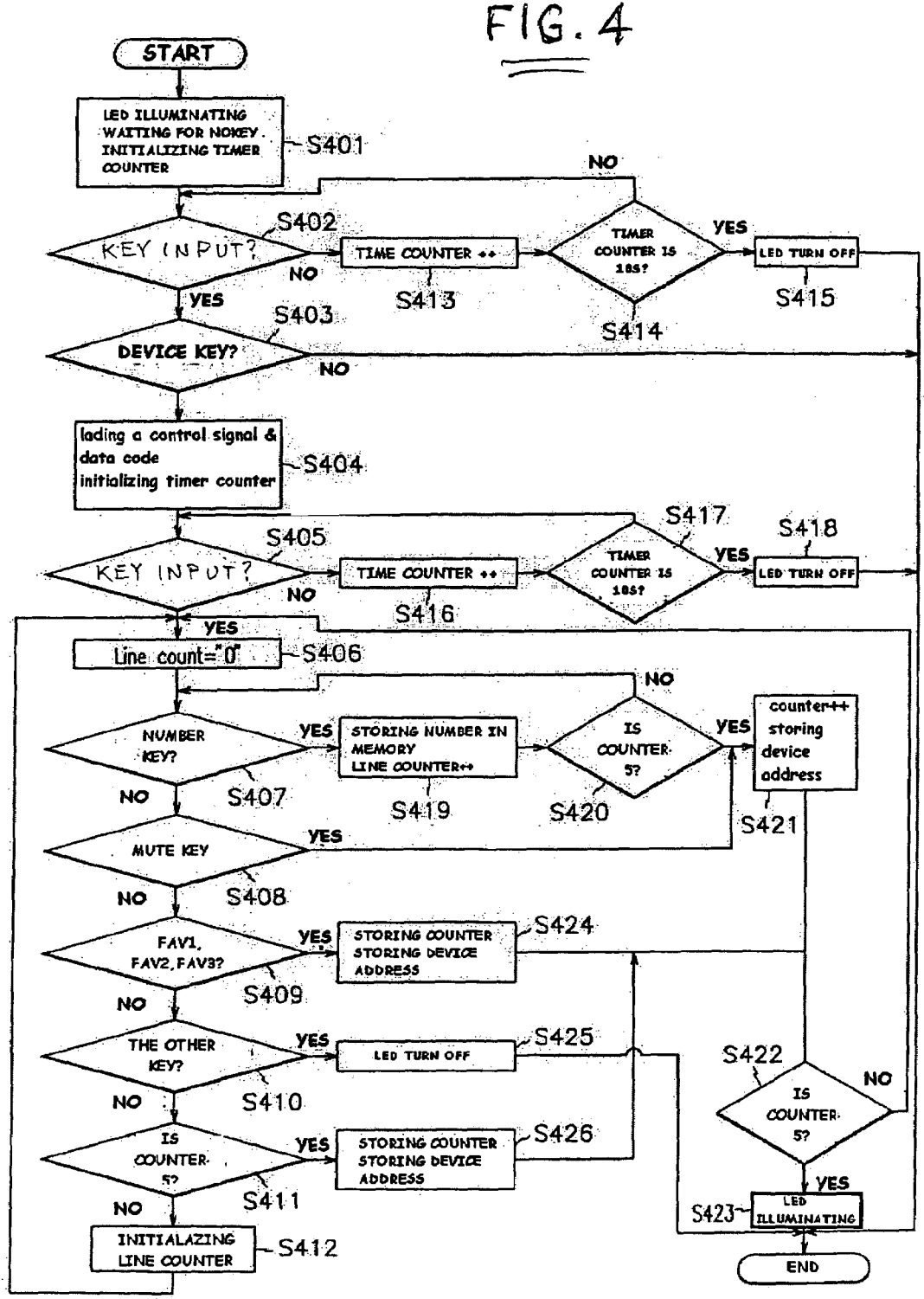

FIG. 4 illustrates the process by means of which the user can store codes for up to five channels for each of the favorite keys. The Favorite Channel Store mode is initiated when one of the favorite channel keys and the mute key are pushed simultaneously and held for more than three seconds. When this happens, the LED 60 is illuminated, as indicated at S401 in FIG. 4, thereby informing the operator of entry into the favorite channel store mode. In addition, the internal timer counter is initialized.

At step S402, it is determined whether another key input has occurred. The timer S414 determines whether ten seconds have passed without having received such a further key input, and returns to step S401 and turns the LED off as indicated at S415 and ends the process.

If a further key has been operated within ten seconds, then it is determined at S403 whether the key actuated is one of the device keys (TV, VCR, SAT, CBL). If not, the favorite channel store mode is ended.

If the key operated is one of the device keys, the microprocessor loads a control signal and data format corresponding to the selected device from the ROM 22, and then initializes the timer counter.

Next, at step S405, it is determined whether a new key input has occurred. If it has not occurred within ten seconds, as determined at steps S416 and S417, then the LED indicator light is turned off at S418 and the Favorite Channel Store mode is ended.

If, at step 405 a new key input has been detected, as indicated at S406, the microprocessor resets a line counter of the RAM 21, as shown in FIG. 2, to store a channel number corresponding to the FAV channel.

Next, at step S407, it is determined whether the key actuated is a number key (0-9). If so, the selected number is sequentially stored in the first memory region (M1), and the memory counter is incremented by one step, as shown at S419. At step 420, it is determined whether the line counter has reached a predetermined maximum value which, in the present case, is five. If not, the next number key input is scanned.

If the line counter reaches the predetermined maximum value, then a channel number is stored in the first memory region (M1) and the storing of the data is ended after the LED 60 is illuminated twice or four times, as indicated at S421, 422 and 423.

Even though the line counter has not yet reached a predetermined maximum value, if the MUTE key is pushed, as indicated at S408, the line count at that time is stored.

For example, as seen in FIG. 2, after channel number "023" is stored, if the operator pushes the MUTE key, then the number three is stored in the line counter to retrieve the channel number, and the LED 60 is illuminated twice or four times, and the process is ended.

In this example, it is the MUTE key which has been assigned the task of being the enabling key. However, as it has been explained above, using another designated key instead of the MUTE key is possible.

The operator then can store the channels desired to be included in the favorite channel grouping in each of the five memory locations (M1-M5) using the same method as that described above. For example, as it is shown in FIG. 2, for favorite channel group FAV1, the channel number "023" is stored in the first memory region (M1), channel number "12" is stored in the second memory region (M2), channel number "1234" is stored in the third memory region ($M_3$), and channel number "32" is stored in the fourth memory region (M4). No channel number is stored in the fifth memory region (M5).

Still referring to FIG. 4, after channels have been stored for a first selected favorite key, it is determined whether another favorite key (for example, F2 or F3) has been actuated, as indicated at S409.

If so, the other channels are stored in the RAM 21 as indicated at S424, using the same process as that used to store the channels for FAV1. This process can be continued until all three Favorite Channel keys have been programmed.

If another favorite key has not been actuated, as determined at S409, at S410 it is determined whether some other key has been actuated. If so, the LED indicator light is turned off as indicated at S425, and the storing process is ended.

If some other key has not been actuated, as determined at S409, it is determined whether the line counter has reached its predetermined maximum value, as indicated at S411. If so, the line count is stored, as indicated at S426. If not, the line counter is initialized as indicated at S412 and the program returns to S406 to store another channel.

Figure 5:
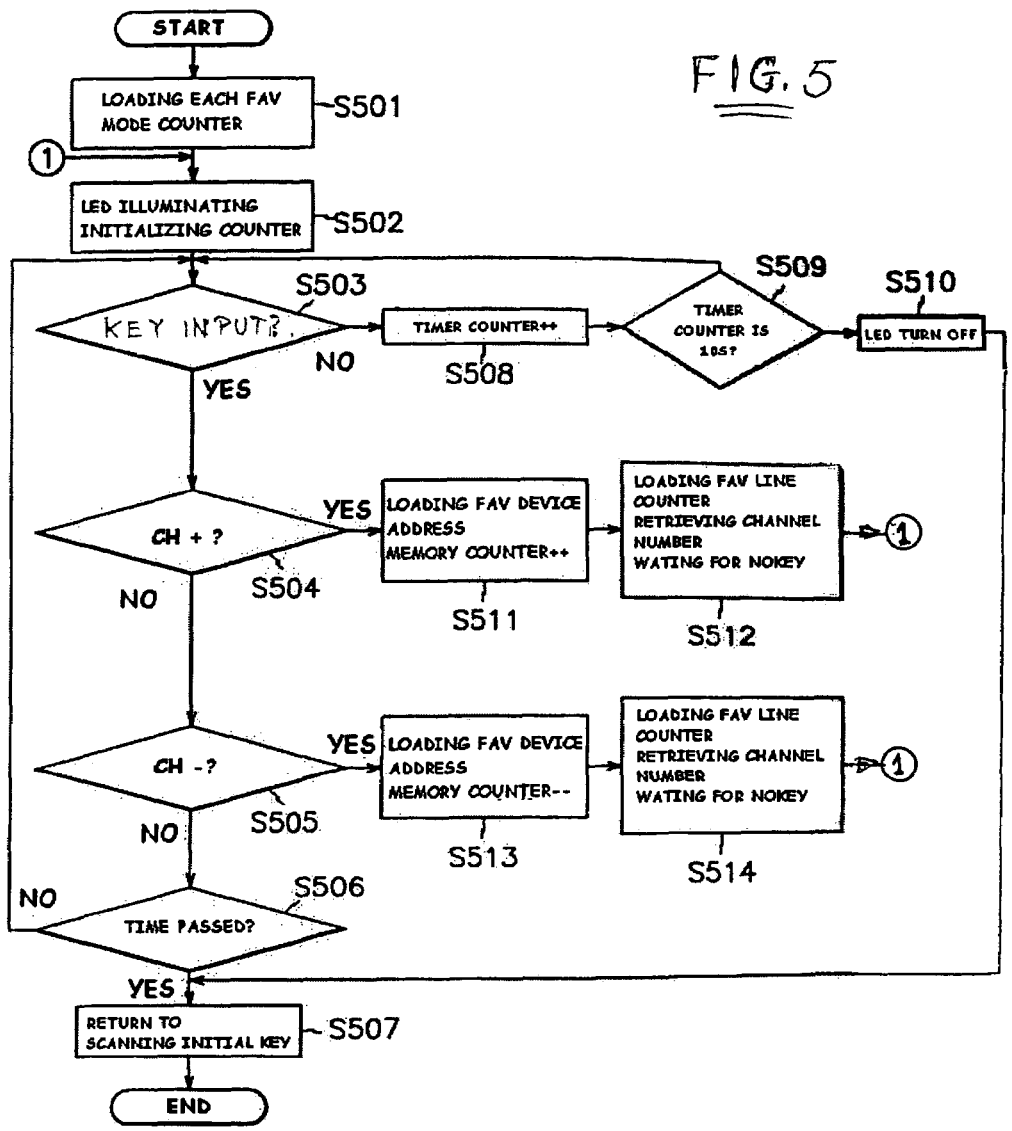
FIGS. 3, 4 and 5 are flow charts illustrating the operation of the unit shown in FIGS. 1 and 2.

FIG. 5 is a flow chart showing the storing of a selected channel for a favorite key. The flow chart of FIG. 5 shows the details of the process occurring at S312 in FIG. 3.

The control mode is entered by the selection of one of the favorite channel keys (in this case F1), as described above. The microprocessor first loads the line counter of memory ($M_1$-$M_5$) corresponding to F1, as indicated at S501 in FIG. 5. The LED 60 is illuminated and the counter is initialized, as indicated at S502.

At S503, it is determined whether a key has been actuated. If none is actuated within ten seconds, the timer counter counts down at S508 and, as indicated at S509, the system returns to look again for another key input at S503. The LED 60 is turned off as indicated at S510.

If a key has been actuated within ten seconds, it is determined, at S504 and S505, whether it is a channel "up" key or a channel "down" key which has been operated.

If the selected key is a channel "up" key, the microprocessor 20 increments the line counter, and then a channel number is extracted and a control signal is transmitted. This is repeated until the channel "up" key is released. These functions are illustrated at S511 and S512.

A similar procedure is followed if the channel down key is the one being operated.

When the foregoing procedure has been followed and the remote controller memory has data stored as shown in FIG. 2, if the channel "up" key is pushed continuously, control signals are transmitted by the remote controller in the following order:

012(M1)→M1(M2)→1234(M3)→32(M4)→023(M1)
→12(M2)→1234(M3)→32(M4)→32(M4)→ . . .

If the key which is operated is a channel "down" key, the microprocessor decrements the counter until it reaches the count of the line counter and extracts a channel number, transmits a control signal, and repeats this process until the down channel key is released.

Referring again to FIG. 2, when the channel down key is pushed continuously, control signals are transmitted in the following sequence:

32(M4)→1234(M3)→12(M2)→023(M1)→32(M4)
→1234(M3)→12(M2)→023(M1)→ . . .

In FIG. 2, the Memory Counter indicates which memory is selected. The Line Counter indicates the number of channel numbers which is stored in the line. For example, in line M1, there are 3 numbers "023". The "ff" symbol indicates that nothing is stored at that location.

The arrows underneath the "CH DN" and "CH UP" notations indicate the direction of scanning the lines in response to actuation of the channel down or channel up keys.

If neither the channel up key nor the channel down key is operated for a predetermined time period, as indicated at S506, the system returns to the scan mode in which the microprocessor waits for another key input.

As an example of how the remote controller of the invention can be used, in use with a cable television system having many channels, up to five broadcast channels can be stored in the group controlled by key F1; up to five cable movie channels can be stored in the group controlled by key F2; and a third group, consisting of sports channels, can be stored in the group controlled by key F3.

Thus, the operator can select channels having a desired characteristic by actuating one of the favorite channel keys and pushing the channel "up" or channel "down" key. For example, if the user wants to watch one of his favorite sports channels, he actuates key F3 and pushes the channel "up" or channel "down" key.

It should be understood, of course, that any type of grouping of channels can be created by the operator, as desired.

It also is within the scope of this invention to pre-program the favorite channel keys at the factory, storing the channels in groups according to the local popularity of the programs stored and saving the customer from having to program his own remote control unit.

It also should be understood that whereas three favorite channel keys have been described, the number of favorite channel keys can be increased or decreased, as desired. If the number is increased, only one key need be added to the keyboard because the same channel up and channel down keys are used for all.

Furthermore, scrolling through the channels in any group is relatively quick and easy because no special scrolling keys need be added, and the keys can scroll either up or down to quickly reach the desired channel.

Also, although a maximum length of five digits for a channel number is shown (FIG. 2), the number of digits can be increased as needed and desired.

The above description of the invention is intended to be illustrative and not limiting. Various changes or modifications in the embodiments described may occur to those skilled in the art. These can be made without departing from the spirit or scope of the invention.

What is claimed is:

1. A remote control device for remotely selecting channels on a video device, said control device comprising:
    a transmitter for transmitting control signals to said video device;
    a plurality of favorite channel group keys;
    each of said favorite channel group keys adapted for controlling the selection of one group from a set of predetermined groups of channels less than all available channels;
    said remote control device having an up/down key device for scanning through channels to be selected in said video device other than said channels selectable by means of said favorite channel group keys;
    said up/down key device being adapted to scroll upwardly and downwardly through the list of channels included in the channels selected by the operation of one of said favorite channel group keys.

2. A device as in claim 1 in which said up/down key device is enabled to control the selection of channels only in a selected one of said predetermined groups of channels when one of said favorite channel group keys has been operated.

3. A device as in claim 1 including a memory and means for storing in said memory control signals for the channels in each of said predetermined groups of channels, said up/down key device being adapted to operate to retrieve control signals from said memory upon the operation of one of said channel group keys.

4. A method of operating a remote control device to rapidly select a desired channel, said method comprising:
    (a) storing identification signals for a plurality of selected channels in each of a plurality of groups;
    (b) operating one of a plurality of switches, one for each of said groups, to select the channels in one of said groups; and
    (c) using the up/down scrolling device of said remote control device to scroll through said channels in said one group.

5. A process for controlling the transmission of control signals from a remote controller to a video receiver so as to select a channel within a favorite channel group when a favorite channel selector switch is operated and to select another channel when a favorite channel group is not selected, said process comprising:
    (a) detecting a favorite channel selector switch which has been selected;
    (b) enabling an up/down channel scanner to choose among the group of channels selected; and (c) transmitting signals corresponding to the chosen channel.

6. A process as in claim 5 including detecting the simultaneous actuation of a favorite channel selector switch and a predetermined other switch to actuate a storage mode to enable programming channel and device selection data into a memory.

7. A process as in claim 6 including detecting whether a subsequent input is a channel "up" signal or a channel "down" signal during said storage mode, and changing the memory region of said memory in which to store said channel data.

8. A process as in claim 7, including using a line counter to count the number of digits in a channel number and store that count in said memory, and reading out said line count when retrieving a channel number from said memory and signaling completion of read-out when the line count for a given channel has been met.

9. A process as in claim 6 in which said other switch is a MUTE switch.

10. A process as in claim 5 further comprising: determining the character of the channels of each of a plurality of predetermined groups of channels, each being actuated by a different group selection switch on the remote controller, and selecting the channels within each such group so as to have the same character.

* * * * *